April 21, 1931.  H. A. BEILGARD  1,801,323
PASTRY SHELL FORMING MACHINE AND METHOD
Filed March 21, 1927  5 Sheets-Sheet 1

INVENTOR
Harvey A. Beilgard
By
*[signature]*
ATTORNEY

April 21, 1931. H. A. BEILGARD 1,801,323
PASTRY SHELL FORMING MACHINE AND METHOD
Filed March 21, 1927 5 Sheets-Sheet 4

INVENTOR
Harvey A. Beilgard
ATTORNEY

April 21, 1931.　　　H. A. BEILGARD　　　1,801,323
PASTRY SHELL FORMING MACHINE AND METHOD
Filed March 21, 1927　　5 Sheets-Sheet 5

INVENTOR
Harvey A. Beilgard
By
ATTORNEY

Patented Apr. 21, 1931

1,801,323

UNITED STATES PATENT OFFICE

HARVEY A. BEILGARD, OF LOS ANGELES, CALIFORNIA

PASTRY-SHELL-FORMING MACHINE AND METHOD

Application filed March 21, 1927. Serial No. 176,986.

As may be inferred from the title, this invention relates to a machine for forming comparatively thin shells, said shells being retained in enclosing forms during the baking operation, optionally coated or lined with a colored or other edible material, and finally delivered in a state adapting the same to be filled with ice cream, or the like; and this invention also includes what I may call an hydraulic method of producing comparatively thin and uniform walls, of a suitable pastry batter, within exterior molds or form elements,—the latter being automatically opened and closed at suitable intervals and heated and rotated between the mentioned closing and opening movements.

It is a further object of my invention to provide a pastry shell forming organization, of the general character described, which is adapted to be so disposed beneath a heat-confining hood or cover, and therefore within a baking atmosphere, that sets of pairs of forms disposed upon horizontal arms may be rotated during the baking operation,—said rotation being effected by power means. Said power means may be utilized also in an upward delivery of a pastry batter into closed forms, while the latter are momentarily at rest at a filling station; and, in preferred embodiments of my invention, I may use substantially identical means for providing baked shells, in advance of their removal from enclosing molds, with one or more linings or interior coatings or layers of a preferred water-proofing or other edible composition,—the last-mentioned composition being preferably so employed as to indicate the flavor of the contents and to contribute to a decorative "freckled" effect.

As indicated, it is an object of my invention to provide a novel method for forming thin-walled edible shells by means comprising heated external forms upon or between which a suitable pastry batter is so delivered that a desired thickness thereof remains adherent to said forms,—an unbaked residue of the pastry batter, or its equivalent, being hydraulically withdrawn; and, in preferred embodiments of my invention, in order that the pastry shells shall not collapse during the mentioned withdrawal, means are provided for an upward delivery of air, into said shells, during the hydraulic withdrawal of the excess of batter therefrom; operations of the general character referred to may be repeated in the provision of any desired interior coatings or layers within shells, formed and baked in the general manner referred to.

Other objects of my invention, including numerous mechanical details and general arrangements, may be best appreciated from the following description of an illustrative embodiment thereof, taken in connection with the appended claims and the accompanying drawings in which Fig. 1 may be referred to as a general elevational view, with parts broken away.

Fig. 7 is a vertical sectional detail view, taken substantially as indicated by the line 7—7 of Fig. 5.

Fig. 11 is a perspective view showing an edible product such as may be produced by means and methods referred to.

Referring to the details of that specific embodiment of my invention chosen for purposes of illustration, in order to impart a bird's-eye-view of the means and methods hereinafter described, and referring more particularly to Figs. 1, 8, 9 and 10, I mention that under a circular or other hood (indicated diagrammatically at 12 and provided with a suitable interior heating means 13) I provide a main base 14 with a frame comprising uprights 15 and a top or table 16 I show means (comprising Geneva gear elements 17 and 18) for imparting intermittent rotation to a shaft 19, which extends thereabove and indirectly carries a set of radial brackets 20,—which provide bearing arms 21 for separately rotatable horizontal shafts 22. Each shaft may be provided with a separately rotatable head on which several rows of cooperating pairs of form elements 23, 23' (providing relatively movable concave walls) may be pivotally mounted, in such manner that any suitable pastry batter delivered thereto, while said form elements are held in a closed position, may be heated to a baking temperature by means such as the burner or burners 13,—disposed thereabove or elsewhere beneath the downwardly extending hood 12.

Assuming that the central vertical shaft 19, or its equivalent, carries five of the brackets 20, each provided with a radial bearing arm 21, and assuming that a central hollow post 24, through which the vertical shaft 19 extends, is provided with a stationary gear 25, engageable by gears 26 upon substantially vertical shafts 27, carried by the respective brackets 20, intermeshing beveled gears 28 and 29 being provided upon the shafts 22 and 27, by giving the gears 25 and 26 a ratio such as 5 to 6, I may provide for a rotation of each shaft 22, each carrying a head 30 (the latter being shown as each equipped with a unit of six sets or rows of pairs of form elements) I may provide that a given set of pairs of form elements return to a lowermost position, at a given station or point in the circumference of a horizontal circle swept by the shafts 22, only after completing six trips entirely around the table 16; and, I accordingly may equip each organization of the described character with but a single filling or loading organization 31. At this loading station, a pair of form elements 23, 23' are preferably held in their closed relationship by means such as a resiliently supported clip during the injection of a suitable pastry batter 33 by means such as a nozzle 34; and in order to provide for a withdrawal of air, to permit the batter to enter, and for a subsequent introduction of air into a space 35, left above the level of the batter as the excess thereof is hydraulically withdrawn, I show an air pipe 36 as centrally disposed within the nozzle 34 and as reciprocable relatively thereto,—means for effecting desired movements of the form elements 23, 23' and the additional parts mentioned in connection therewith being more fully described hereinafter.

Figures 2, 4:
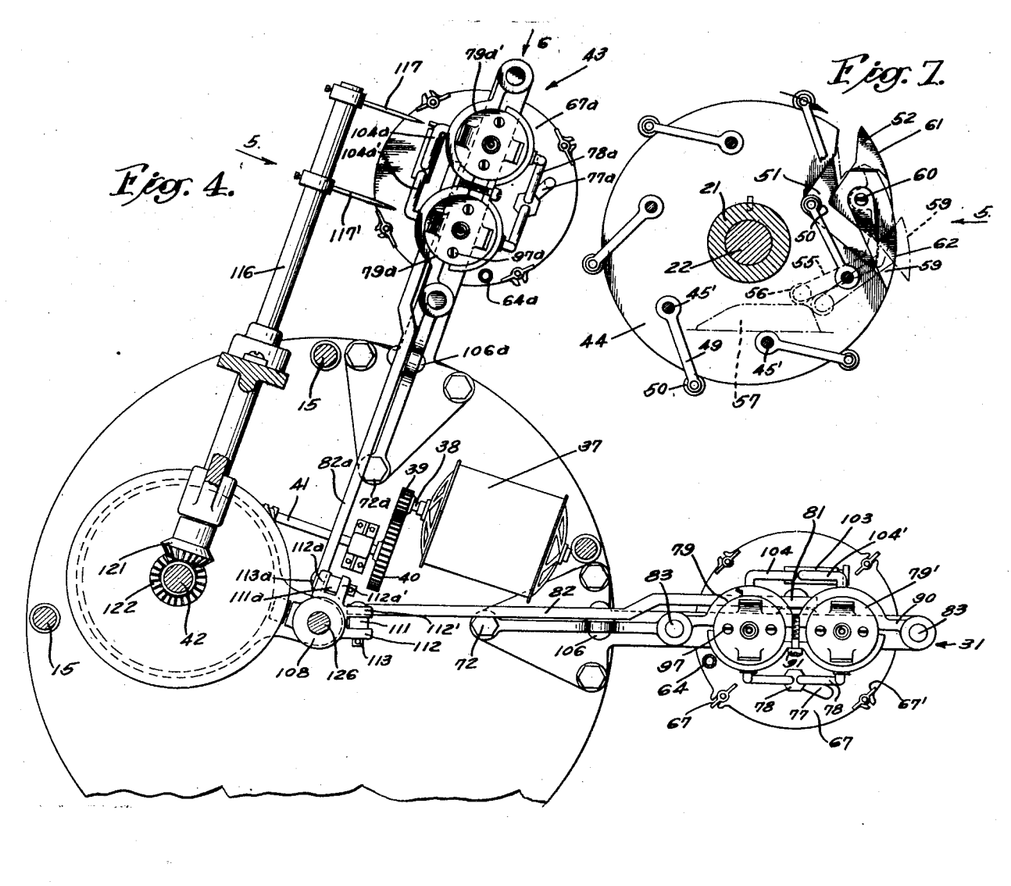
Fig. 2 is a detail view, on a somewhat enlarged scale, taken substantially as indicated by the arrow 2 of Fig. 1, and showing a preferred relationship of parts during the ejection of a pastry batter or the like, into a cavity formed by complemental pivoted form elements, while held in a dependent position.
Fig. 4 is a horizontal sectional view, taken substantially as indicated by the line 4—4 of Fig. 1.

As to preferred details of my driving and power-transmitting mechanism, I show, in Fig. 4, a motor 37,—the shaft 38 thereof carrying a small gear 39, being in constant engagement with a larger gear 40, and the shaft 41 of this latter gear being provided with means (such as a worm engaging a worm gear upon a vertical shaft 42) for imparting rotation to the mentioned gear 17,—to impart intermittent movement to the described movable parts supported by the table 16, or its equivalent; and, to impart an opening movement to successive sets of pairs of form elements 23, 23', during their "final" return past a so-called coating or lining station 43 (which, assuming various parts to rotate in the direction of arrows applied thereon may be the next station to the right or back of the filling station 31) I may employ means of any suitable character. For example, securing a cam plate 44 upon each bearing arm 21, and securing the form elements 23, 23' against rotation upon separate shafts 45, 45' having bearings in plates 46, 47 and 48, I may provide one shaft in each cooperating pair with means such as a crank 49, shown as terminating in a cam roller 50, adapted to engage the cam plate 44, or its equivalent. The crank arms 49 may advantageously be sufficiently resilient and so set that whenever the cam rollers 50 engage the periphery of the cam plate 44, the form elements 23, 23' are resiliently held in mutual contact; but I show said cam plate (see Figs. 5 and 7) as provided with means for occasionally opening a groove 51 and guiding successive cam rollers 50 therethrough. For the purpose last referred to, I show a movable inlet gate member 52 as secured upon a flat face 53 of the cam plate 44 by means of a threaded pivot pin or screw 54 and as provided with an integral arm 55, terminating in a cam roller 56,—adapted to engage a cam 57, shown as secured on the stationary top 16 by screws 58; and I show what I may term an outlet or gravity-operated gate member 59 as pivotally secured, by a threaded pin or screw 60 (which may be identical or concentric with the mentioned pin or screw 54). It should be understood that the curvatures of the peripheral faces 61 and 62 of the gate members 52 and 59 (the former being shown as open and the latter being shown in a closed position in which it normally remains,—except as it may be forced open by cam roller 50) are intended to be the same as that of the periphery of the cam plate 44,—in order that all pairs of cam elements may remain closed except that pair which, having completed almost a sixth trip around the table 16 after being lined with a pastry batter (and optionally coated, during any trip) is ready to be removed; and, to effect a filling of the form at the filling station 31 and a removal of the baked shells as said forms approach the coating or lining station 43 on their fifth revolution (in the case assumed) I may employ any preferred suitable means.

Figures 1, 2:
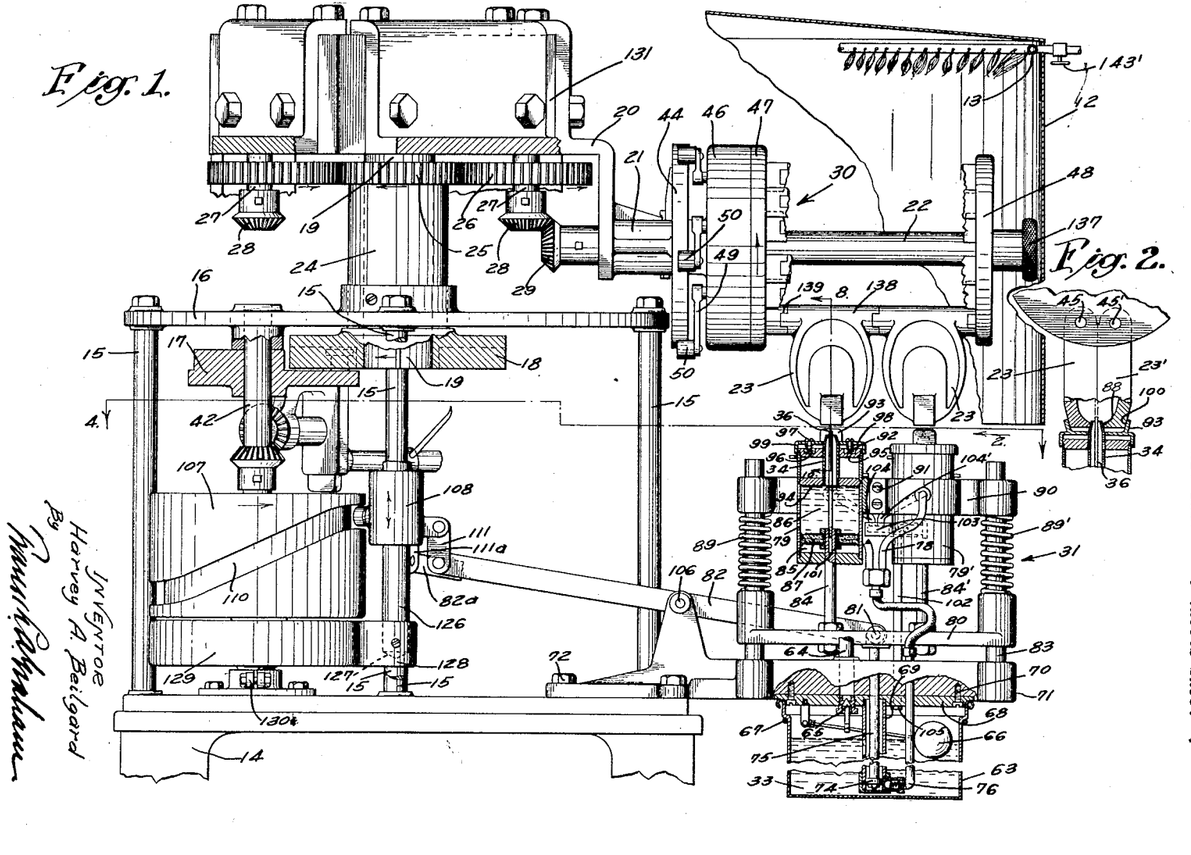

Referring to Figs. 1 and 4, I show a batter reservoir 63 (which may be provided with an inlet pipe 64 communicating with any convenient source of supply, not shown,—said inlet being preferably equipped with an inwardly opening valve 65, shown as controllable by a float 66) as removably retained by means comprising a circumferential band 67 (disposed beneath a downward facing shoulder and carrying bolts provided with wing nuts 67') in contact with a plate 68, to which is secured a pump cylinder 69. The plate 68 is shown as secured by screws 70 beneath a casting 71, and the latter may be secured in any suitable way, as by bolts or screws 72, to the base 14, or its equivalent.

I show the cylinder 69 as provided with a plunger 74 on a rod 75 and with a valved outlet pipe 76. This pipe is shown as connected by a hose or flexible section 77 and a manifold 78. From this, separate branch pipes lead into batter-injector cylinders 79,—with which the mentioned nozzles 34 may be directly connected.

Above the casting 71, I show a plate 80 as pivotally connected at 81 with a lever 82; and this plate, shown as guided in a vertical plane by posts 83, may be rigidly connected not only with the downwardly-extending plunger rod 75 but with upwardly-extending plunger rods 84, 84',—shown as carrying not only the air pipes 36 but plungers or pistons 85, reciprocable within the cylinder 79, 79' and serving to separate batter compartments 86 from air compartments 87 therein; and, in order that, each descent of the plate 80 being effective to force a predetermined quantity of pastry batter into the cylinders 79, 79', each elevation of said plate may be effective to hold cooperating pairs of form elements 23, 23' in closed position during the insertion of the nozzles 34 in openings 88, shown as formed by mating notches therein, during an injection of pastry batter from the compartments 86, and during a subsequent withdrawal of excess batter, I may support and equip the cylinders 79 in the general manner indicated in Fig. 1. That is to say, providing the posts 83 with compression springs 89, 89', I may dispose thereon an upper plate 90, apertured slidably to receive said posts; and, although rigidly securing the cylinders 79, 79' to the plate 90, as by screws 91, I may resiliently support, from said plate or said cylinders, as by means comprising subsidiary springs 92, suitable form-engaging clips 93. The nozzles 34 being supported from the cylinders 79, 79' by means such as interior partitions 94 and/or top closure or guide elements 95, the latter may be provided with depressions 96, adapted to receive the springs 92; and the latter may be guided therein by means such as screws 97, shown as projecting downwardly from a horizontal portion 98, integral with the clips 93. The outer periphery of each plate 98 is preferably downwardly turned at 99, to assure guidance by the portion of a cylinder 79, 79' or members thereon; and the inner, form-engaging surfaces 100 of the clips 93 are shown as so inclined as to constitute cam or wedge means for holding the form elements together, during the rise of the nozzles 34 and the delivery of batter, or the like, therebetween. Between the horizontal elements 94 and 95, a heating or cooling liquid may be circulated, as required.

It will be understood that each upward movement of the plate 80, as occasioned by a rocking of the lever 82, is effective yieldably to advance the clips 93 into engagement with the form elements 23, 23', before the nozzles 34 rise therebetween; that said nozzles are then upwardly pressed by means comprising the springs 89, 89'; and that, after the said upward movement of nozzles and that of the cylinders 79, 79' is completed, in the indicated manner, further advance of the plungers or pistons 85 is effective to deliver pastry batter through said nozzles,—air being in the meantime permitted to descend through the air pipes 36 and through passages 101, into the air chambers 87; and that, during a subsequent withdrawal of the excess of batter, by a lowering of the piston 85, air is admitted or forced upward, through the pipe 36, to permit a satisfactory emptying of the space within the mentioned form elements, only a thin layer of batter being retained thereon,—by reason of its adhesion and/or by reason of a change in its state, as produced by heating.

In order to obviate necessity for a too-precise regulation of the capacity of the chambers 86 and 87, as compared with the space provided within a cooperating pair of form elements 23, 23' (or within a pastry product, or the like, formed therein) I prefer to provide for an escape of excess batter from said cylinders,—as by connecting a return pipe 102 with a valve-equipped manifold 103, from which branch pipes 104, 104' may extend to a suitable level in the batter compartments 86 in cylinders 79, 79';—the lower end of this pipe being optionally carried, as shown at 105, to a point within the batter tank or receptacle 63; and, in order to provide for a timely reciprocation of the lever 82, shown as pivoted at 106, I may employ any suitable means,—such as a cam 107, shown as secured upon the mentioned shaft 42, and a vertically reciprocable element 108, shown as equipped not only with a roller-carrying pin 109, entering a cam slot 110, but also with a pivotally connected link 111 adapted to manipulate the lever 82.

To provide positive pivoted means, when such are desired, for removing baked pastry shells, or the like, from forms, assuming these latter to be pivotally separated, in the described manner, during a re-approach to the coating or lining station 43, or its equivalent, I may employ any suitable means; and it should be understood that said coating or lining station, when provided, may be equipped in the same general manner as the filling station 31. For example, providing the vertically reciprocable element 108 not only with a pair of lugs 112, 112', to receive a pivot pin 113 for the link 111, but with an additional pair of lugs 112a, 112a' apertured for the reception of a pin 113a, shown as extending through a link 111a', I may pivotally connect the last-mentioned link to a lever 82a, adapted to cooperate with parts corresponding with those to which the characters 63—106 have been above applied,—some of the analogous parts here referred to being correspondingly numbered, but with an added "a", in Figs. 4 and 6; and it will be understood that, by reason of the specific character of the driving mechanism and the specific gear ratios above indicated, a shell, as formed by the injection of batter at the filling station 31, may undergo four and four-fifths complete movements about the table 16 (being in the meantime rotated four times about a horizontal shaft 22) before it is brought momentarily to rest, in a dependent position, at the lining or coating station 43.

Figure 3:
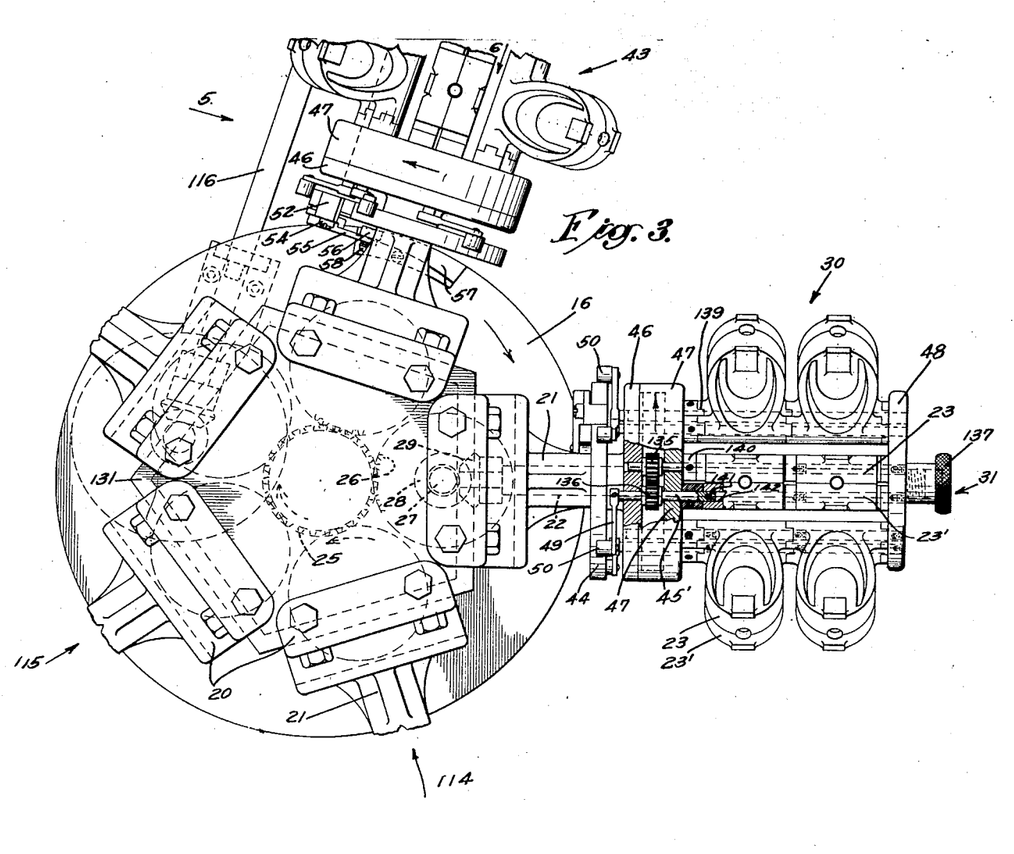
Fig. 3 is a top plan view, with parts omitted or broken away.

With reference to the illustrative statements last made, it will be noted that, by reason of the mentioned ratio between gears 25 and 26, a set of form elements which occupy a dependent position at the filling station 31 do not again occupy a dependent position until, passing said filling station, they arrive, during a second circuit, at the next station (opposite 114 in Fig. 3) to the left thereof; when the mentioned set of forms again occupy a dependent position, they will be at the next station, 115 (during their third circuit) and it will thus be only near the end of their fifth circuit that the particular set of forms referred to occupies a lowermost position at the coating or lining station 43. During their next and final circuit, when some subsequently-filled set of forms occupies a dependent position at the lining station 43, the first-mentioned baked and coated or lined forms, these being then pivotally moved apart as best shown in Figs. 5 and 6, will be seen to occupy a position adapting said baked and coated or lined shells (in case they have not dropped off, upon the pivotal separation of said form elements) to be picked therefrom by any suitable means.

For the purpose last referred to, I show a horizontal shaft 116 as disposed substantially parallel with the axis of that bearing arm 21 which extends toward the lining station 43 and as provided with a plurality of straight or bent shell-removing fingers 117. To impart rotation to the shaft 116, or its equivalent (any desired receptacle or chute 118 being provided therebelow) I may employ means such as a short parallel shaft 119, shown as supported from table 16 by a bracket 120 and as provided at its inner end with a gear 121, engageable by a like gear 122, upon the shaft 42,—gears 123 and 124 upon the cooperating ends of shafts 116 and 119 being shown as protected by a bearing bracket 125.

Referring to certain preferred details of construction, the reciprocable element 108, by which the levers 82 and 83 are shown as mechanically manipulable, may be carried by a central post 126,—which need not be identical with the shaft 19, even if coaxial therewith; and this post 126 may, if desired, be seated in a suitable socket,—such as that shown at 127 as provided in a projection 128 upon a gear case or housing 129. This housing, employed to enclose a worm gear driven by a worm on shaft 41, said worm gear being secured on the shaft 42, may be secured by a clamp 130; and it may provide a lower bearing for the shaft 42, or its equivalent.

Figure 5:
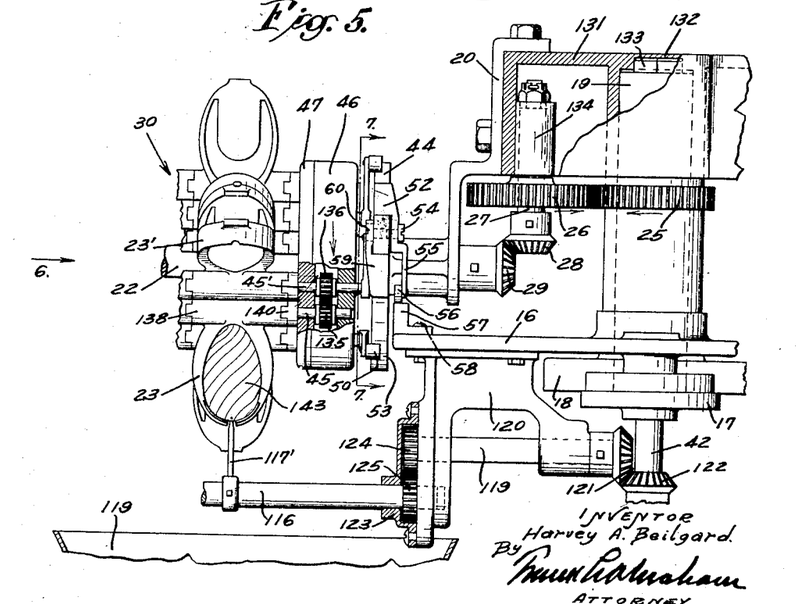
Fig. 5 is a partial elevational view, taken substantially as indicated by the arrow 5 of Figs. 3, 4 and 6, with parts broken away.
Figure 6:
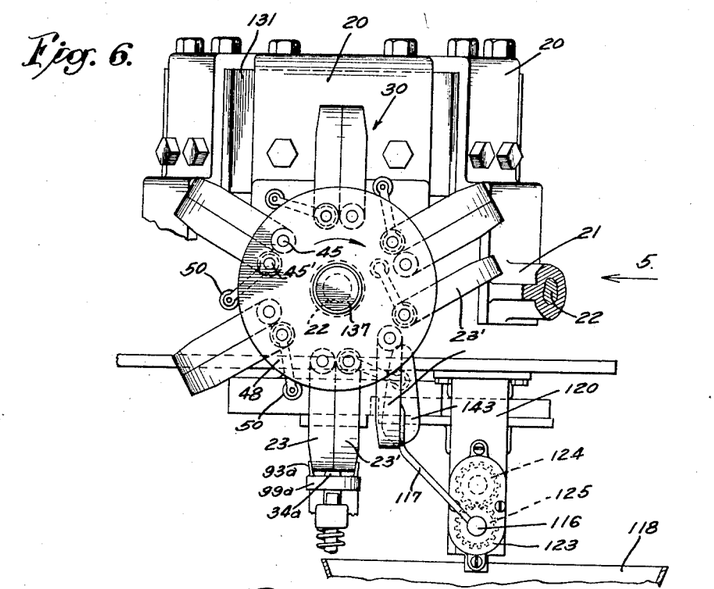
Fig. 6 is an elevational view, with parts broken away, taken in the direction indicated by the arrows 6 of Figs. 3, 4 and 5.
Figure 8:
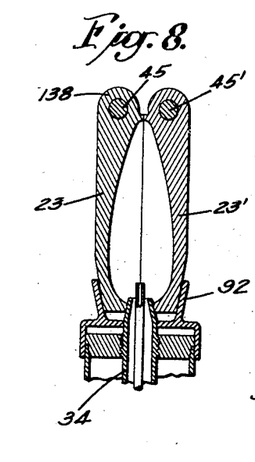
Figs. 8, 9 and 10 are diagrammatic sectional views, taken substantially as indicated by the lines 8—10 of Fig. 1 but on an enlarged scale, these views being hereinafter referred to as disclosing means and methods of forming or lining a pastry shell within a mold or between a pair of complemental pivoted form elements.
Figure 9:
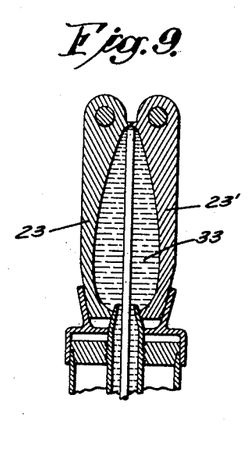
Figure 10:
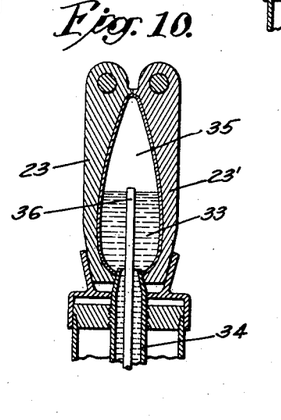

The shaft 19 may be connected with the brackets 20 by means such as a pentagonal head 131,—this head being shown, in Fig. 5, as provided, interiorly of its top 132, with a squared socket, interfitting with a squared end 133, on said shaft, and as provided also with bearings 134 (see Fig. 5) for the shafts 27, carrying gears 26 and 28.

To provide housings for small gears 135 and 136 on the mentioned shafts 45 and 45', by which the form elements 23, 23' may be oppositely rotated and held open (while the fingers 117, 117' remove any adherent perfected shells therefrom—during each sixth or "last" circuit,—upon the completion of which the same set of form elements will occupy a dependent position suitable to a relining of the same at station 31) both or either of the plates 46, 47, constituting a pair and providing bearings for said shafts, may be flanged substantially as shown; and, in order that, upon substitution of shafts 22 of appropriate length (the outer ends of these shafts being shown as provided with removable clamping members 137) the form elements 23, 23' being shown as provided with rounded shaft-receiving ends 138, which laterally terminate in clutch-like faces 139, I may include any desired number of pairs of form elements in each set, by securing clutch-like elements 140 upon each innermost section of one of the shafts 45, 45', I may provide threaded connections (somewhat as shown at 141, Fig. 3) between any desired number of shaft sections.

These sections may correspond in length with horizontal passages 142, provided in the shaft-receiving ends of the form elements; but the length of the innermost shaft sections, to which the clutch elements 140 are secured, should be such as to occasion an outward or axial advancement of all of the remaining shaft sections,—so that the outermost shaft sections may extend into or through and be supported by the bearing plates 48. But it will be obvious that the capacity of a machine of the described general character may be varied not only by changing the number of pairs of molds in each set disposed between the plates 47 and 48 but also by varying the number of pairs of shafts 45, 45′ comprised in each head 30 and/or by varying the number of these heads.

In beginning the operation of a machine of the general character described, any suitable pastry batter 33 being provided in the tank 63, or its equivalent, up to a level established by the float 66, or its equivalent, (no external heat being applied to the tank 63, under ordinary conditions) and a suitable coating or lining material being similarly provided in the corresponding tank at station 43 (or in any desired similar or additional tanks provided at other stations) and a desired baking temperature being provided by any suitable heating means (as, by adjustment of a burner valve 143′, regulating the supply of gas fed to a central or annular or other burner 13) it will be seen that, upon starting the motor 37, or its equivalent, the successive heads 30 will be respectively advanced and rotated relatively to the table 16 with stops at the respective mentioned stations; and, by reason of the numerical ratios and gear ratios referred to, the first set of pairs of form elements to be filled (by upward injection and withdrawal of excess batter or its equivalent at station 31) will be rotated, during the travel of the horizontal shafts 22 once about the table 16, through somewhat less than a complete revolution. Thus, it will only be in the course of its fifth revolution about the table 16 that the set of forms referred to, having meantime revolved intermittently upon a horizontal shaft 22, will occupy a lowermost position at station 43. At this station, any baked or otherwise hardened hollow products in the forms may undergo an interior coating or lining operation, by the injection of a suitably colored edible composition,—as, an oil-containing and/or glucose-containing mixture distinctively colored,—to harmonize with or indicate the flavor of an ice cream, or the like, subsequently to be inserted. Thus all shells may undergo a suitable baking operation, by conduction of heat from or through the form element, as the same are rotated within a heated enclosure such as that provided by the hood 12, or its equivalent, in advance of the introduction of the coating or lining composition; and this coating or lining may ordinarily be intended to have a partial or complete water-proofing effect,—so that the pastry shells (whether or not the coating or lining shall materially contribute to their self-sustaining consistency) shall not be unduly softened by any solvent action of the ice cream, or the like. A final circuit of the mentioned set of form elements around the table 16 may suffice to harden the coating or lining composition therein. At the conclusion of the final circuit referred to, a subsequently-filled set of pairs of form elements then occupying a lowermost position at station 43, the mentioned set of baked and coated or lined shells is intended to drop or be removed from the forms 23, 23′, by the described opening movement between said forms and/or by the action of the mentioned fingers 117, 117′.

Only at the next movement following that at which a first-charged set of form elements is emptied, in the described manner, will said first-charged form elements (at their 30th stop—having made six circuits of the table with five stops during each circuit—in the case assumed) be recharged with a lining of pastry batter; but it will be understood that some one of the thirty indicated sets of form elements (6 sets to each of 5 shafts) will be recharged at each stop of a head 30 at the filling station 31,—so that, event assuming but six pairs of form elements in each set (where two pairs are shown, for simplicity of illustration) and allowing (say) but one minute for each head, rotating on its horizontal axis as it goes, to complete the circuit of the table 16, or its equivalent, the per hour production of a shell-perfecting organization of the described character may amount to upward of 2000 baked and coated or lined shells or similar hollow articles.

Figure 11:
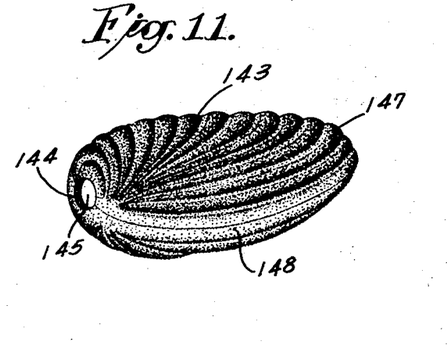

Obviously, the so-called shells, a preferred form being illustrated at 143 as provided with an opening 144 through which a lining 145 may be clearly seen (at least pending the filling of said shell through said opening) can be formed of any desired pastry or other composition; and said shells may have a great variety of forms and/or colors; but, I prefer, in order to enhance the palatability and the attractiveness of my described products, and in order to obviate deterioration upon the insertion of ice cream, or the like, therein, to use a batter and a baking temperature such that the shells may be characterized not only by a brownish tint but by minute pores, formed therein by bubbles; and I prefer also to employ, as a lining or interior coating material, a composition which, although water-repellent or capable of being hardened into a substantially insoluble condition by baking, shall indicate by its color (harmonious with but distinct from that of the shell) as said color may appear in dots provided by a limited outward flow of the mentioned coating or lining material into the mentioned pores, the flavoring or character of a subsequently-introduced ice cream, or the like. Although it will be obvious that such means as I have described may be used in the formation of either solid or shell-like or layered products of any desired character, it will be appreciated that in case ice cream is to be inserted, entirely separate (even if similar) means may advantageously be employed in the final filling operation.

The form elements 23, 23' may advantageously be cast from a metal, such as aluminum, from which a baked product, of any usual or preferred composition, may readily separate; one form element of each pair (as, each form element 23) may be provided with a slight negative angle favorable to a momentary retention of a shell therein; and any interior irregularities in the form elements, such as irregularities required to produce curved or other prominences 147, may be rounded favorably to an automatic dropping or easy lifting of baked shells therefrom; but the diameter of the opening 144 is intended, in all cases, to be substantially less than the interior diameter of the shell. As indicated, the color of any "freckles" 148, as produced by an outward flow of a coating, lining or filling material, may produce a distinct color effect; but it should be understood that any desired number of interior coatings or layers may be produced in the general manner described; and that hardening of some or all of the layers may be effected either by heating or by drying or by other operations. I consider it more advantageous to provide a thin layer of pastry material between concave walls by flowing the same therein and withdrawing excess, in the described manner, than forcibly to spray the same therein, through nozzles or pipes of the general character described.

Although I have herein described a single complete embodiment of my invention, suggesting various alternatives, it should be understood not only that various features of this invention might be independently employed but also that numerous modifications might easily be devised, by those skilled in the arts to which this case relates, without involving the slightest departure from the spirit and scope of my invention, as the same is indicated above and in the following claims.

I claim as my invention:

1. A method of producing edible products which comprises: injecting into a concavity provided between relatively movable walls a suitable edible shell-forming mixture, withdrawing any excess of said mixture by establishing a pressure differential between the interior and the exterior of said shell so as to leave a hollow shell thereof within said concavity; hardening said shell while in contact with said walls; and separating said walls, to release said shell.

2. A method of producing edible products which comprises: injecting into a concavity provided between relatively movable walls a suitable edible shell-forming mixture, so withdrawing any excess of said mixture as to leave a hollow shell thereof within said concavity; hardening said shell while in contact with said walls; injecting an additional fluent material adapted to harden on the inner surface of said shell and withdrawing an excess thereof to form a coating or layer within said shell; and separating said walls, to release said shell.

3. A method of the general character defined in claim 1, in which said injection is upwardly effected while air is caused downwardly to escape.

4. A method of the general character defined in claim 1, in which air is admitted to the shell above the mixture during a downward withdrawal of said excess of said mixture.

5. A method of the general character defined in claim 1, in which said injection is upwardly effected while air is permitted oppositely to escape, and in which said withdrawal of excess is effected during an admission of air to replace said excess.

6. A method of the general character defined in claim 1, in which said hardening is effected by heat imparted through said walls, and in which a lining or coating is provided within said shell, in advance of the mentioned release.

7. A method of forming pastry shells which comprises: forming a hollow layer of a pastry batter which contacts only on the external surface with enclosing walls by filling the enclosing walls with batter and withdrawing an excess of batter therefrom; baking said layer while so enclosed; and separating said walls from said surface.

8. In means for the production of hollow edible shells; a pair of mating form elements; means for opening and closing the same; means for filling said form elements, when closed, with a pastry batter; means for hardening an outer layer of said batter to form a self-sustaining shell; and means for withdrawing the unhardened batter from the interior of said shell, said last-mentioned means including the means for filling.

9. In means for the production of hollow edible shells: a pair of mating form elements; means for opening and closing the same; means for producing a hollow layer of a suitable food composition within said form elements while closed; means for injecting into said shell a fluent material adapted to harden on the inner surface of said hollow layer; and means for withdrawing an excess of said material from said hollow layer for producing a lining within said shell.

10. In means for the production of hollow edible shells: a pair of mating form elements; means for opening and closing the same; means for producing a hollow layer of a suitable food composition within said form elements while closed,—said layer-producing means comprising a nozzle movable to and from said opening and means correlated with said nozzle operable to inject and remove a pastry batter into and out of said form elements.

11. In means for the production of hollow edible shells: a pair of mating form elements; means for opening and closing the same; means for producing a hollow layer of a suitable food composition within said form elements while closed,—said layer-producing means comprising a nozzle movable to and from said opening; means correlated with said nozzle operable to inject and remove a pastry batter into and out of said form elements; and means for holding said form elements closed during engagement by said nozzle.

12. In means for the production of hollow edible shells: a pair of mating form elements; means for opening and closing the same; means for producing a hollow layer of a suitable food composition within said form elements while closed,—said layer-producing means comprising a nozzle movable to and from said opening; means for holding said form elements closed during engagement by said nozzle; and means for withdrawing air from within said form elements.

13. In means for the production of hollow edible shells: a pair of mating form elements; means for opening and closing the same; means for producing a hollow layer of a suitable food composition within said form elements while closed,—said layer-producing means comprising a nozzle movable to and from said opening; means for holding said form elements closed during engagement by said nozzle; and means for admitting air into said form elements during the withdrawal of an excess of said food composition.

14. In means for the production of hollow edible shells: a pair of mating form elements; means for opening and closing the same; means for producing a hollow layer of a suitable food composition within said form elements while closed,—said layer producing means comprising a nozzle movable to and from said opening; means for holding said form elements closed during engagement by said nozzle; and means for withdrawing an excess of said food composition from said form elements.

15. In means for the production of hollow edible shells: a plurality of radially disposed units each consisting of a rotatable shaft and a plurality of pairs of mating form elements radially mounted upon said rotatable shafts; means for opening and closing said form elements; means for producing a hollow layer of a suitable food composition within said form elements while closed; means for intermittently advancing said units from station to station between closing and opening movements of said form elements; and means for intermittently rotating said shafts for changing the radial position of said form elements.

16. In means for the production of hollow edible shells: a unit consisting of a plurality of pairs of mating form elements; means for opening and closing said form elements; means for producing a hollow layer of a suitable food composition within said form elements while closed; and means for advancing said unit of form elements from station to station between closing and opening movements of said form elements, and means for intermittently changing the position of said form elements so that each set of forms repeatedly passes each station before being opened.

In testimony whereof, I have hereunto set my hand at Los Angeles, California, this 8th day of March, 1927.

HARVEY A. BEILGARD.